(12) United States Patent
Beck et al.

(10) Patent No.: US 11,228,922 B2
(45) Date of Patent: Jan. 18, 2022

(54) METHOD AND SYSTEM FOR GENERATING A CONTOUR

(71) Applicant: CommScope Technologies LLC, Hickory, NC (US)

(72) Inventors: Andrew E. Beck, Ashburn, VA (US); Meihua Liang-Legrand, Vienna, VA (US); Navin Srinivasan, Fairfax, VA (US)

(73) Assignee: CommScope Technologies LLC, Charlotte, NC (US)

( * ) Notice: Subject to any disclaimer, the term of this patent is extended or adjusted under 35 U.S.C. 154(b) by 7 days.

(21) Appl. No.: 16/754,531

(22) PCT Filed: Aug. 31, 2018

(86) PCT No.: PCT/US2018/049107
§ 371 (c)(1),
(2) Date: Apr. 8, 2020

(87) PCT Pub. No.: WO2019/083612
PCT Pub. Date: May 2, 2019

(65) Prior Publication Data
US 2020/0275288 A1 Aug. 27, 2020

Related U.S. Application Data

(60) Provisional application No. 62/577,999, filed on Oct. 27, 2017.

(51) Int. Cl.
*H04W 16/30* (2009.01)
*H04W 24/08* (2009.01)
(Continued)

(52) U.S. Cl.
CPC .......... *H04W 16/30* (2013.01); *H04B 7/0617* (2013.01); *H04B 17/309* (2015.01);
(Continued)

(58) Field of Classification Search
CPC ... H04W 16/30; H04W 24/08; H04W 52/242; H04W 16/14; H04W 24/02; H04W 24/10;
(Continued)

(56) References Cited

U.S. PATENT DOCUMENTS

| 7,660,591 B1 | 2/2010 | Krishnakumar et al. |
| 2002/0063656 A1 | 5/2002 | Gutowski |

(Continued)

FOREIGN PATENT DOCUMENTS

WO 2008131125 A1 10/2008

OTHER PUBLICATIONS

International Bureau, "International Preliminary Report on Patentability from PCT Application No. PCT/US2018/049107", from Foreign Counterpart to U.S. Appl. No. 16/754,531, dated May 7, 2020, pp. 1 through 8, Published: WO.

(Continued)

*Primary Examiner* — Fred A Casca
(74) *Attorney, Agent, or Firm* — Fogg & Powers LLC

(57) ABSTRACT

In one embodiment, a method is provided. The method comprises determining a free space path loss distance at a frequency of a transmitter; determining a morphology class for a geographic location of the transmitter; determining a scaling factor P corresponding to the determined morphology class; determining a circular analysis region based upon the scaling factor P; and generating a contour.

10 Claims, 8 Drawing Sheets

(51) Int. Cl.
  *H04W 52/24* (2009.01)
  *H04B 17/391* (2015.01)
  *H04B 7/06* (2006.01)
  *H04B 17/318* (2015.01)
  *H04B 17/309* (2015.01)
  *H04B 17/336* (2015.01)

(52) U.S. Cl.
  CPC ......... *H04B 17/318* (2015.01); *H04B 17/336* (2015.01); *H04B 17/3913* (2015.01); *H04W 24/08* (2013.01); *H04W 52/242* (2013.01)

(58) Field of Classification Search
  CPC ... H04W 24/06; H04W 52/243; H04W 16/18; H04B 17/3911; H04B 7/0617; H04B 17/3913; H04B 17/318; H04B 17/309; H04B 17/336
  See application file for complete search history.

(56) References Cited

U.S. PATENT DOCUMENTS

| | | | | |
|---|---|---|---|---|
| 2006/0003774 | A1* | 1/2006 | Byun | H04W 16/18 455/453 |
| 2006/0262731 | A1 | 11/2006 | Carlson et al. | |
| 2010/0120413 | A1 | 5/2010 | Kennedy, Jr. et al. | |
| 2013/0337844 | A1* | 12/2013 | Meredith | H04W 64/00 455/456.5 |
| 2015/0198447 | A1* | 7/2015 | Chen | G01S 5/0252 701/472 |
| 2015/0223027 | A1* | 8/2015 | Ahn | G01S 5/0236 455/456.1 |
| 2017/0127257 | A1* | 5/2017 | Saxena | H04W 4/60 |
| 2019/0215698 | A1 | 7/2019 | Balachandran et al. | |

OTHER PUBLICATIONS

Code of Federal Regulations, "Part 96—Citizens Broadband Radio Service", Title 47: Telecommunication—Chapter I—Subchapter D, Mar. 31, 2020, pp. 1-19, Electronic Code of Federal Regulations.

International Searching Authority, "International Search Report from PCT Application No. PCT/US2018/049107", dated Jan. 10, 2019, pp. 1-12, Published: WO.

USGS, "National Land Cover Database", Earth Resources Observation and Science (EROS) Center, at least as early as Apr. 2, 2020, pp. 1-2, https://www.usgs.gov/centers/eros/science/national-land-cover-database?qt-science_center_objects=0#qt-science_center_objects.

Wikipedia, "Free-space path loss", Feb. 14, 2020, pp. 1-5, https://en.wikipedia.org/wiki/Free-space_path_loss.

Wireless Innovation Forum, "Requirements for Commercial Operation in the U.S. 3550-3700 MHz Citizens Broadband Radio Service Band", Working Document WINNF-TS-0112 Version V1.2.0, Jul. 13, 2017, pp. 1-70, The Software Defined Radio Forum Inc.

* cited by examiner

METHOD AND SYSTEM FOR GENERATING A CONTOUR

This application claims priority to International Patent Application No. PCT/US2018/049107 filed on Aug. 31, 2018, which claims priority to U.S. Provisional Patent Application No. 62/577,999 filed on Oct. 27, 2017, the contents of both of which are hereby incorporated herein in their entirety.

BACKGROUND

Spectrum Access Systems (SASs) are being developed to provide services in bands shared with other communications systems. Each spectrum access system regulates transmission of Citizens Broadband Radio Service Devices (CBSDs) that form part of a citizens broadband radio system that incorporates a SAS. The SAS is responsible for managing CBSD power levels to minimize signal interference to other users. To manage interference, the SAS determines an RF coverage region or zone of the CBSD, or a protection zone around one or more CBSDs for interference management. The boundary, or contour, of the coverage or protection zone is defined as a set of points at which the CBSD propagated power level falls below a first threshold level, e.g. −96 dBm/10 MHz. For SASs, this first threshold level may be mandated by a standard such as a WinnForum Working Document WINNF-TS-0112 Version V1.2.0 (13 Jul. 2017). The SAS uses the coverage or protection zone to regulate the transmissions of other CBSDs proximate to the source CBSD so that levels of interference, e.g. carrier to interference levels, do not exceed a second threshold level.

Conventionally, determining the contour entails estimating transmitted power levels around a CBSD using a propagation model, such as Longley-Rice, Okumura, or Hata models (or variations thereof) at hundreds or thousands of grid points around the CBSD up to a maximum radius of R. A polygon, representing the contour, is formed by connecting grid points at which power levels are estimated to be at or about the first threshold level.

The propagation models may account for terrain elevation and/or morphology. Terrain elevation data and/or morphology data at geographic locations, e.g. proximate to each grid point, can be obtained from remote databases, e.g. at the U.S. Geological Survey. However, the extraction of such terrain data from such remote databases is slow. As the number of grid points increases, so does the amount of terrain elevation data that must be extracted. This increases the time taken to generate contours. Therefore, there is a need to expedite generation of contours.

SUMMARY OF THE INVENTION

In one embodiment, a method is provided. The method comprises determining a free space path loss distance at a frequency of a transmitter; determining a morphology class for a geographic location of the transmitter; determining a scaling factor P corresponding to the determined morphology class; determining a circular analysis region based upon the scaling factor P; and generating a contour.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
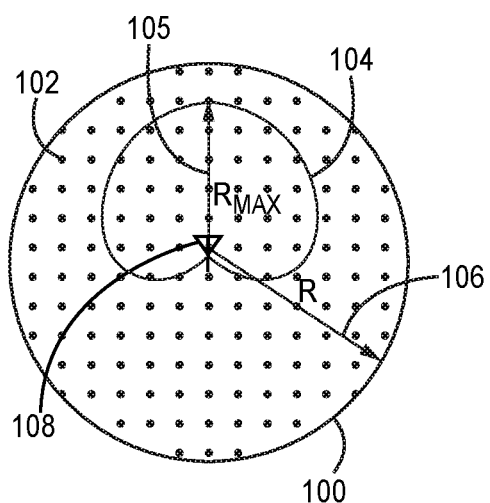
FIG. 1 illustrates one embodiment of an analysis region in which to generate a contour for a first power level emitted by a transmitter.

As will be subsequently further described, illustrated embodiments of the invention more efficiently reduce the number of elevation data extractions by estimating the location of grid points proximate to a contour. Extraneous grid points are not included. Thus, the number of grid points, for which elevation data must be retrieved, is reduced. As a result, the time to determine each contour is significantly decreased.

For pedagogical reasons, some illustrated embodiments will be described in the context of the operation of spectrum access systems (SASs). Embodiments of the inventions improve the efficiency of operation of a SAS in determining protection zones, and thus managing the CBSDs under its control. However, the techniques disclosed herein are also applicable to other applications, for example systems for modeling communications systems or transmitters.

A SAS will now be briefly described. Citizens broadband radio service devices (CBSDs) are part of a spectrum access system (including a SAS control system) which controls access to a frequency. In one embodiment, each CBSD is communicatively coupled to the SAS control system. The operational characteristics of each CBSD, such as operational frequency, transmit power, and channel bandwidth, are centrally controlled by the SAS control system. User equipment, e.g. a portable device such as a handset, a phablet, a tablet or a laptop, wirelessly communicates with a CBSD using a portion of the spectrum controlled by the SAS control system and assigned to the CBSD.

The CBSDs comprise systems of Priority Access Licensees (PALs), and General Authorized Access (GAA) users. Systems of incumbent users also operate in the spectrum regulated by the SAS.

Incumbent users have first, or highest, priority to utilize the frequency spectrum (or spectrum) controlled by the SAS. Thus, incumbent users shall be able to operate free of interference from other users, e.g. priority access licensees and general authorized access users. Free of interference as used herein does not mean an absence of interference, but rather means an acceptable level of interference which may be no interference or a finite level of interference. The acceptable level of interference may vary by geography, frequency spectrum, user type, license type, and/or other indicia. In one embodiment, the incumbent users include governmental communications systems, operators of fixed satellite communications systems, and grandfathered, prior licensees of the spectrum. Communications systems, as used herein, shall include RADAR systems.

In one embodiment, priority access licensees have second, or intermediate, priority, after incumbents, to utilize the frequency spectrum controlled by the SAS control system (which is part of the SAS). In another embodiment, priority access licensees shall be able to operate, when not interfering with incumbent users, free of interference from other priority access licensees and general authorized access users. In a further embodiment, an ability of a PAL to operate free of interference shall be limited temporally, geographically, and spectrally by specifications in its license, e.g. from a government entity.

General authorized access users shall have third, or lowest, priority to utilize the frequency spectrum controlled by the SAS. In one embodiment, an operation of GAA users will be governed by rules pertaining to the SAS, e.g. governmental laws and regulations. For example, such rules shall only let GAA users operate when they do not interfere with incumbent users and PALs.

In one embodiment, the geographic coverage area and frequency spectrum controlled, at least in part, by the SAS control system may include exclusion zones and protection zones. CBSDs are prohibited from operating within exclusion zones. Further, the level of interference generated by, e.g. by all non-Federal users (PALs and GAA users) shall be limited in such exclusion zone so as not to interfere with certain incumbent users such as Federal RADAR systems. Each CBSD may only operate with the permission of the SAS, e.g. in a RADAR protection zone based upon information received by an environmental sensing capability (ESC) system. In another embodiment, the ESC system is a system of receivers that detect transmissions (in the band controlled by the SAS) by incumbent(s) and notify the SAS of any such transmissions.

The SAS determines and implements a protection zone around the CBSD. The boundary, or contour, of the protection zone is defined as a set of points at which the CBSD propagated power level falls below a first threshold level, e.g. −96 dBm/10 MHz. The SAS uses the protection zone to regulate transmissions of other CBSDs proximate to the CBSD so that levels of interference, e.g. carrier to interference levels, within the protection zone do not exceed a second threshold level. Methods and systems for efficiently generating such contours will now be described.

In one embodiment, the contours are generated more efficiently by reducing the area of analysis regions in which analyses are performed to identify contours. In another embodiment, a method of directly and efficiently generating contours is described.

FIG. 1 illustrates one embodiment of an analysis region in which to generate a contour for a first power level emitted by a transmitter (first analysis region) 100. In another embodiment, the transmitter 108 is a CBSD, and the contour 104 is for a power level of a first threshold level, e.g. of substantially −96 dBm/10 MHz. The contour 104 is not necessarily circular (a) because the radiation pattern of the antenna of the transmitter is not necessarily isotropic, and (b) possibly also because of terrain effects.

The first analysis region 100 has a circular perimeter and a radius, R, 106. The radius, R, 106 is larger but proximate to the maximum radial distance, $R_{MAX}$, 105 of the contour 104. For pedagogical purposes, an analysis region 100 that is circular shall be subsequently exemplified with respect to this embodiment. The first analysis region 100 includes grid points 102 at which power levels are estimated to generate the contour 104. The contour 104 is formed by a polygon of connected grid points that have corresponding estimated propagated power levels substantially equal to the first power level. A propagated power level is the power propagated by the transmitter 108 to the corresponding location.

Figure 2:
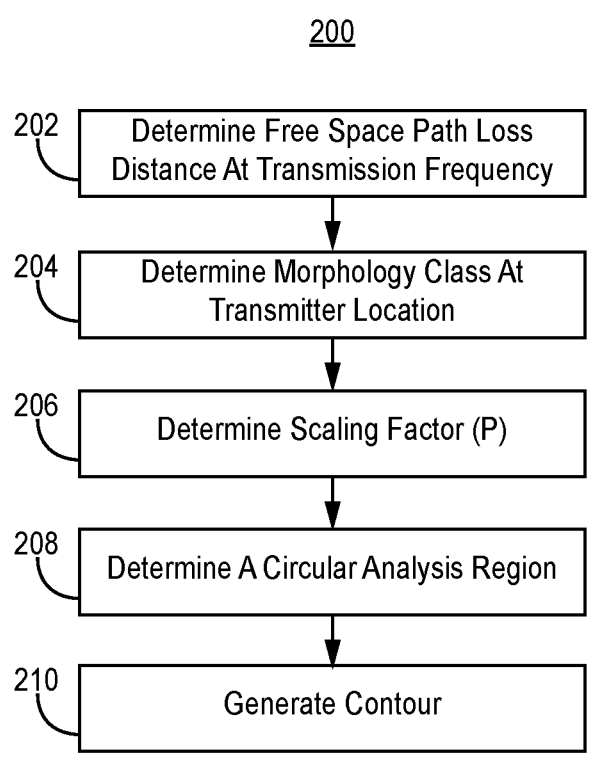
FIG. 2 illustrates one embodiment of a method of determining a radius which is larger than but proximate to the maximum radial distance of a contour.

FIG. 2 illustrates one embodiment of a method of determining the radius, R, which is larger than but proximate to the maximum radial distance, $R_{MAX}$, of the contour (method 1) 200. To the extent the method 1 200 shown in FIG. 2 is described herein as being implemented in the systems shown in FIGS. 7 and 8, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 202, determine a free space path loss distance at the transmission, or transmitter, frequency. In one embodiment, first calculate path loss at contour power level of first threshold level:

$$PL = txPower + Gain - rxPower \quad (1),$$

where PL is path loss, e.g. in decibels (dB), txPower is transmitter power ratio per unit of frequency, e.g. in decibels referenced to a power level such as decibels referenced to one milliwatts (dBm) with respect to frequency, e.g. 10 MHz, Gain is antenna gain ratio, e.g. in decibels isotropic (dBi) or decibels relative to a dipole (dBd), and rxPower is the propagated power level, also a ratio, equal to the first threshold level, e.g. in decibels referenced to the power level per unit frequency such as dBm per MHz, e.g. dBm per 10 MHz. Alternate variations of equation (1) may be used to accommodate the use of other parameter unit(s); such variations will not be listed but are known to those skilled in the art.

Then, calculate the free space path loss distance:

$$R_{FSPL} = 10^{\left(\frac{PL - 20\log_{10} f - k}{20}\right)}, \quad (2)$$

using Friis transmission formula, where $R_{FSPL}$ is free space path loss distance, path loss (PL) is in dB, and f is the transmission, or transmitter, frequency. Alternate variations of equation (2) may be used to accommodate the use of other parameter unit(s); such variations will not be listed but are known to those skilled in the art. When $R_{FSPL}$ is in units of km and f is in units of MHz, then k=32.45. Alternatively, $R_{FSPL}$ can be calculated in a single step by incorporating equation (1) into equation (2).

In block 204, determine a morphology class for a geographic location of the transmitter. For example, the morphology class can be rural, suburban, or urban. In one embodiment, morphology class can be obtained from a database such as a remote database, e.g. the U.S. Geological Survey's land use land cover database.

In block 206, determine a scaling factor P corresponding to the determined morphology class. In one embodiment, the scaling factor P is one of $P_{urban}$, $P_{suburban}$, and $P_{rural}$, which are respectively the scaling factors for urban, suburban, and rural morphologies. Typically, $0 < P_{urban} < P_{suburban} < P_{rural} \leq 1$. In another embodiment, $P_{rural}$ is 1, and $P_{urban}$ and $P_{suburban}$ are less than one, e.g. respectively 0.25 and 0.5. In a further embodiment, the scale factors are selected by a user or may be analytically modelled. In yet another embodiment, $0<P_{suburban}<P_{urban}<P_{rural}$ in the event multipath signals are constructive, or additive.

In one embodiment, determine if the transmitter is located in a structure such as a building. If so, then multiply the scaling factor P determined above by another scaling factor $P_{indoor}$: $P*P_{indoor}$. In another embodiment, $P_{indoor}$ is less than 1, e.g. equaling 0.5.

In block 208, determine a circular analysis region. In one embodiment, determine the analysis region based upon determining a radius of the analysis region: $R=R_{FSPL}*P$. Alternatively, in another embodiment, if the transmitter has been determined to be located in a structure, then determine the analysis region based upon determining the radius of the analysis region: $R=R_{FSPL}*P*P_{indoor}$.

In block 210, generate the contour 104. In one embodiment, also determine the propagated power level at each grid point with the contour using the following equation:

$$rxPower=txPower+Gain-PL \qquad (3),$$

Path loss, PL, is determined using, for example, a propagation model, and possibly terrain elevation data which can be obtained, e.g. from the U.S. Geological Survey. Alternate variations of equation (3) may be used to accommodate the use of other parameter unit(s); such variations will not be listed but are known to those skilled in the art. The propagation model may be one of the models described above. Then, identify grid points having determined propagated power levels proximate to the first threshold level, e.g. within a grid point threshold level of the first threshold level. Next, connect such identified grid points to form a polygon that the contour 104.

Figure 3:
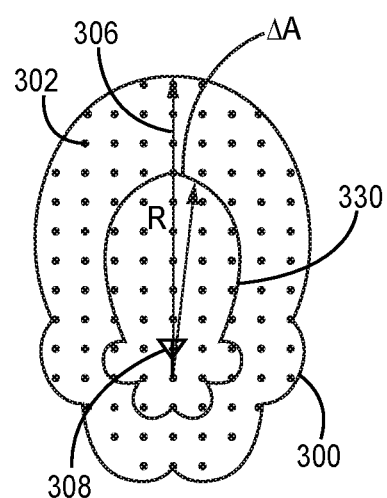
FIG. 3 illustrates another embodiment of an analysis region in which to generate a contour for a first power level emitted by a transmitter.

FIG. 3 illustrates another embodiment of an analysis region in which to generate a contour for a first power level emitted by a transmitter (second analysis region) 300. The second analysis region 300 is determined by scaling a horizontal radiation pattern (horizontal antenna radiation pattern) 330 of an antenna of the transmitter 308. In another embodiment, the transmitter 308 is a CBSD, and a contour to be generated is for a power level of a first power level of substantially −96 dBm/10 MHz. Because the shape of the contour 330 is analogous to the shape of the horizontal antenna radiation pattern, the contour 330 is not necessarily circular because the horizontal antenna radiation pattern 330 is not necessarily isotropic, and possibly also because of terrain effects.

In this embodiment, the analysis region is defined by determining a maximum radius, R, 306 of the analysis region 300 at an azimuthal angle at which the main beam of a horizontal radiation pattern 330 of the antenna, of the transmitter 308, has the greatest gain, e.g. in dBi; this azimuthal angle is also known as the antenna boresight. Then, the analysis region 300 is generated by scaling the analysis region 300 with respect to the gain in dBi of the horizontal antenna radiation pattern 330 at other azimuthal angles. As a result, the analysis region 300 has a shape that is substantially similar to the horizontal antenna radiation pattern 330. For purposes of clarity, the illustrated analysis region 300 of FIG. 3 is not necessarily proportionally scaled.

The analysis region 300 includes grid points 302 at which power levels are estimated. The contour, e.g. of the first power level, is generated as described below. Firstly, a maximum range, R, is determined at the antenna boresight. Then, the analysis region 300 is correspondingly scaled about that maximum range based upon the horizontal antenna radiation pattern 330.

Figure 4:
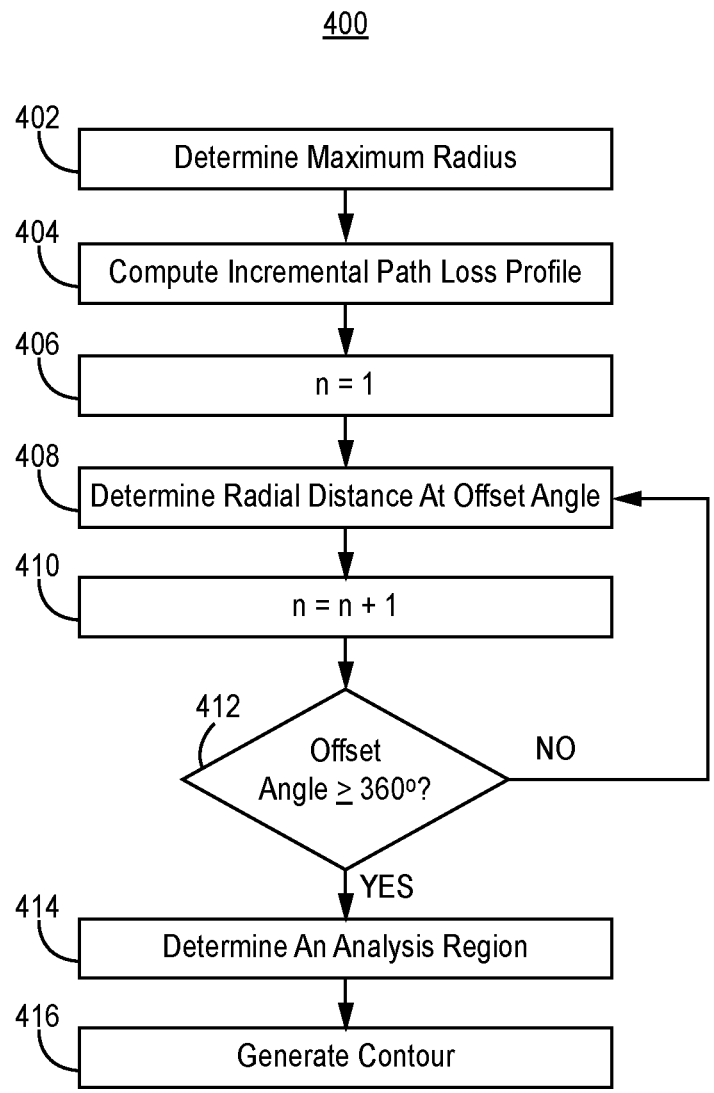
FIG. 4 illustrates one embodiment of a method of determining a radius which is larger than but proximate to a maximum radial distance of a contour.

FIG. 4 illustrates one embodiment of a method of determining the radius, R, which is larger than but proximate to the maximum radial distance of the contour (method 2) 400. To the extent the method 2 400 shown in FIG. 4 is described herein as being implemented in the systems shown in FIGS. 7 and 8, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 402, determine a maximum range, R. In one embodiment, this is accomplished by assuming a value of the maximum range, R, based on experience or modelling. In another embodiment, calculate the maximum range, R, using method 1 200.

Optionally, in block 404, compute a gain database with respect to the maximum range. The gain database is a set of relative gains, i.e. incremental propagated power levels (incremental rxPower levels) less the power level at the maximum range (e.g. which corresponds to maximum antenna gain), and corresponding radial distances from the transmitter. In one embodiment, the differential power levels in the gain database are described in terms of decibels (dBs). In another embodiment, the incremental propagated power levels are in −1 dB increments. In a further embodiment, the first increment is 0 dB. In yet another embodiment, the final increment is substantially the difference between the horizontal antenna radiation pattern gain at boresight, and the minimum gain of the horizontal antenna radiation pattern. For example, if the horizontal antenna radiation pattern gain at the boresight is 10 dBi, and the minimum antenna gain is −30 dBi, then the final step is −40 dB.

In one embodiment, when generating contour(s) for systems operating, such as for an exemplary SAS system, the foregoing data may be pre-calculated for different types of antennas and stored in e.g. in a database. One illustration of an exemplary lookup table is provided below:

| Relative Gain | Radial Distance |
| --- | --- |
| 0 dB | 74.6 km ($R_{MAX}$) |
| −1 dB | 66.4 km |
| −2 dB | 59.2 km |
| −3 dB | 52.8 km |
| . . . | . . . |

As a result, it may not be necessary to compute the gain database; rather the gain database may be accessed from a database upon designating antenna type.

In block 406, set n=1, where n is used to determine an incremental angle (ΔA). In block 408, determine a radial distance along a radial line at the incremental angle. The incremental angle (ΔA) equals of n*(360 degrees/m), where m is a user or system defined parameter. In one embodiment, m is three hundred and sixty, and the incremental angle varies in one degree increments. The incremental angle of the radial line for which the maximum range, $R_{MAX}$, is calculated is zero degrees. Determine the radial distance of each radial line at each incremental angle greater than zero by using the lookup table described above to determine the relative gain of the horizontal antenna radiation pattern 330 at each incremental angle other than zero degrees.

In block 410, set n=n+1. In block 412, determine if the incremental angle is greater than or equal to three hundred and sixty degrees. For purposes of clarity, the incremental angle of the radial line for which the maximum range, $R_{MAX}$, is calculated is deemed to be zero and not to be three hundred and sixty degrees when performing this block. If the incremental angle is not greater than or equal to three hundred and sixty degrees, then return to block 408. If the incremental angle is greater than or equal to three hundred and sixty degrees, then, in block 414, by connecting the determined radial distances. Then, in block 416, generate a contour in a manner similar to that described above for method 1.

Figure 5:
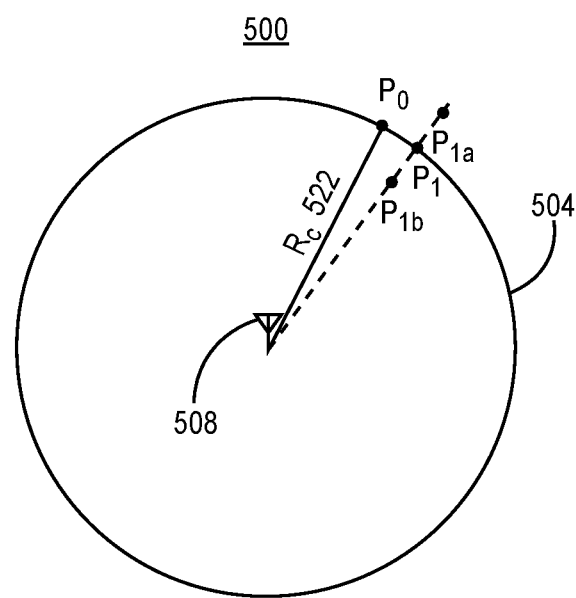
FIG. 5 illustrates one embodiment of a contour for a first power level emitted by a transmitter.

FIG. 5 illustrates one embodiment of a contour for a first power level emitted by a transmitter (first contour) 500. The first contour 500 is generated by determining a radial distance for the first power level $P_0$ along a radius in one azimuthal angle with respect to the transmitter, e.g. the antenna boresight. A contour radial distance, $R_C$, 522 (from the transmitter's geographic location at an azimuthal angle at or offset from the boresight) has a power level equal to the first power level. If the azimuthal angle is the boresight, then radial distance $R_C$ equals $R_{MAX}$.

Incremental angles, as described above, are used but to determine the first contour 500, and not an analysis region. The incremental angle of the contour radial distance, $R_C$, 522 is zero degrees. The power level of each radial angle will be determined as will be subsequently described. In one embodiment, the transmitter 508 is a CBSD, and a contour to be generated is for a power level of a first power level of substantially −96 dBm/10 MHz.

Figure 6:
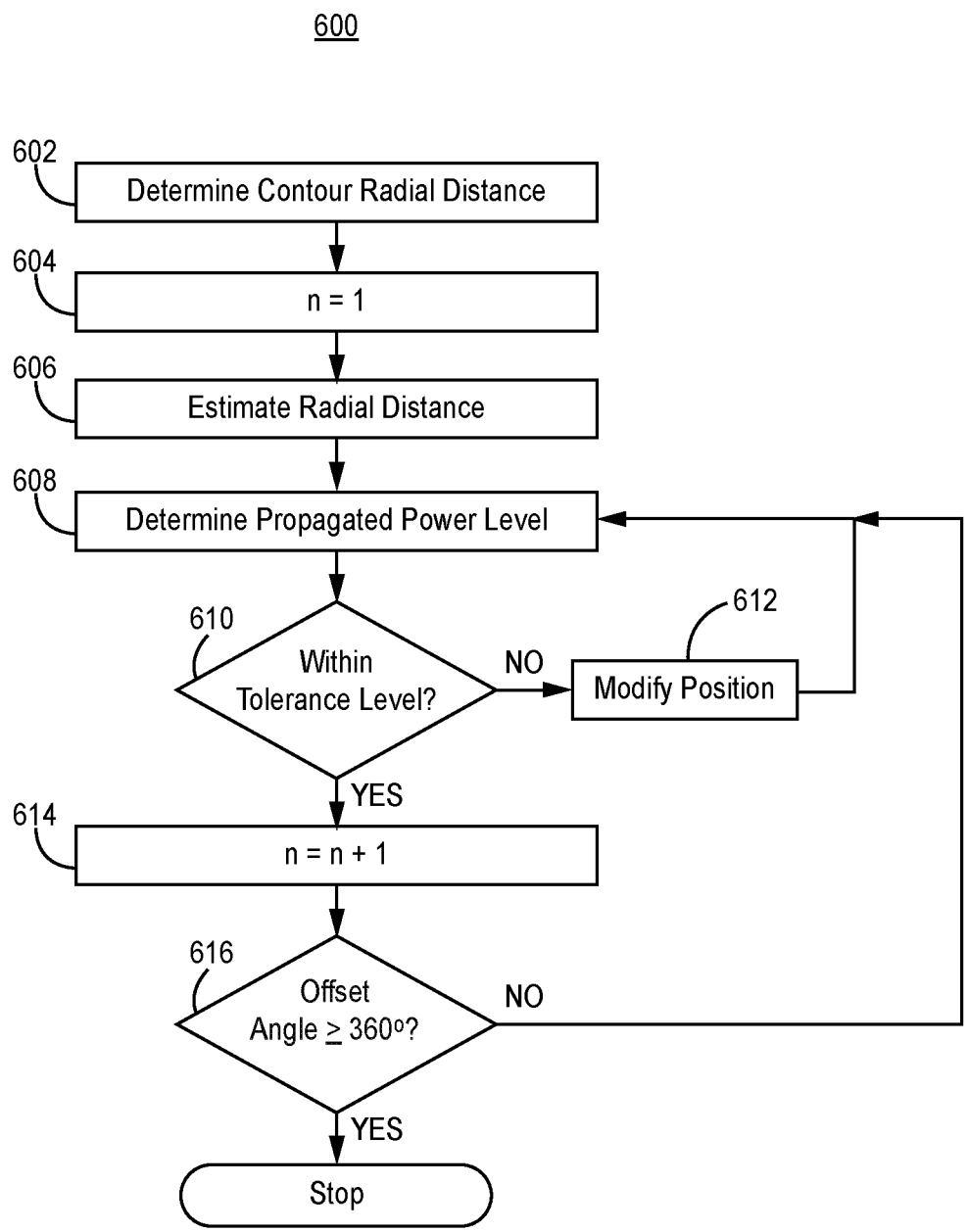
FIG. 6 illustrates one embodiment of a method of determining a contour.

FIG. 6 illustrates one embodiment of a method of determining a contour (method 3) 600. To the extent the method 3 600 shown in FIG. 6 is described herein as being implemented in the systems shown in FIGS. 7 and 8, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 602, determine a contour radial distance, $R_C$, 522 (from the transmitter's geographic location at an azimuthal angle at or offset from the boresight of a horizontal antenna pattern) having a power level equal to the first power level. If the azimuthal angle is the boresight, then radial distance $R_C$ equals $R_{MAX}$.

In block 604, set n=1, where n is used to determine an incremental angle (ΔA). In block 606, estimate, for the incremental angle, a radial distance where the propagated power level may equal the first threshold level. For example, point $P_1$ in FIG. 5 is located at the radial distance and the incremental angle. In one embodiment, estimate the radial distance by setting the radial distance equal to the radial distance, for the prior incremental angle, where the propagated power level was substantially equal to the first threshold level. For example, as shown in FIG. 5, for n=1, the estimated radial distance is the contour radial distance, $R_C$, 522; point $P_1$ is located at the contour radial distance $R_C$ 522 and the incremental angle. In another embodiment, compute or access gain database as described above with respect to block 404, and estimate the radial distance by determining the radial distance as described above with respect to block 408.

Returning to FIG. 6, in block 608, determine the propagated power level at the estimated radial distance and at the incremental angle, e.g. at point $P_1$, for example using equation (3). Calculate the path loss, PL, using a propagation model, and possible terrain elevation data. In block 610, determine if an absolute value of a difference between the propagated power level and the first threshold level is less than a tolerance level, e.g. a tolerance power level or a percentage of the first threshold level. The tolerance level may be specified by the system or a user.

If the absolute value is not within the tolerance level, then in block 612 modify the radial distance, e.g. larger to point such as $P_{1a}$ or smaller to point such as $P_{1b}$, depending as to whether the sign of difference calculated above is respectively negative or positive. $P_{1a}$ and $P_{1b}$ are illustrated in FIG. 5. In one embodiment, the distance along the radial line between $P_0$ and $P_{1a}$, and $P_0$ and $P_{1b}$, is fixed distance, such as a distance between grid points, or a distance that scales to a real-world distance such as 200 meters. In another embodiment, the fixed distance is defined by the system or user.

Returning to FIG. 6, in block 614, set n=n+1. In block 616, determine if the incremental angle is greater than or equal to three hundred and sixty degrees. For purposes of clarity, the incremental angle is zero degrees for the radial line on which the contour radial distance, $R_C$, 522 is determined. If the incremental angle is not greater than or equal to three hundred and sixty degrees, then return to block 608. If the incremental angle is greater than or equal to three hundred and sixty degrees, then stop.

Figure 7:
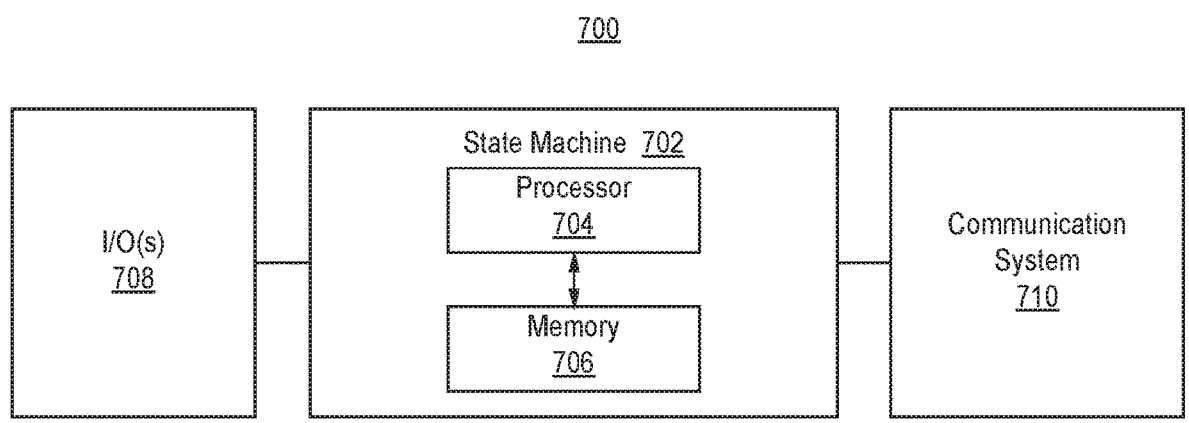
FIG. 7 is a block diagram of an exemplary computer system.

The methods disclosed above may be implemented in one of many systems. FIG. 7 is a block diagram of an exemplary computer system 700 that can implement the such methods. The illustrated computer system 700 comprises a state machine 702 which is implemented with at least one processor (processor) coupled to at least one memory (memory) 706. In another embodiment, the state machine 702 is a computer.

In one embodiment, the computer system 700 may include at least one input/output device (I/O(s)) 708 coupled to the state machine 702. In another embodiment, the I/O(s) 708 includes a display (such as a touchscreen display), a cursor control device, and/or a keyboard. The I/O(s) 708 facilitates the inputting of data by a user, and the display of data to the user. In a further embodiment, the computer system 700 can also incorporates a communication system 710 coupled to the state machine 702, to enable transmission and reception of data with remote systems, such as other computer systems. In one embodiment, the communication system 710 is a data modem, a radio transceiver (with or without an antenna), and/or any other communications device(s).

The processor 704 can be implemented using software, firmware, hardware, or any appropriate combination thereof, as known to one of skill in the art. By way of example and not limitation, hardware components for processor 704 can include one or more microprocessors, memory elements, digital signal processing (DSP) elements, interface cards, and other standard components known in the art. Any of the foregoing may be supplemented by, or incorporated in, specially-designed application-specific integrated circuits (ASICs) or field programmable gate arrays (FPGAs). In this exemplary embodiment, processor 704 includes or functions with software programs, firmware, or other computer readable instructions for carrying out various process tasks, calculations, and control functions, used in the methods described herein. These instructions are typically tangibly embodied on any appropriate medium used for storage of computer readable instructions or data structures.

The memory 706 can be implemented with any available computer readable storage media that can be accessed by a general purpose or special purpose computer or processor, or any programmable logic device. Suitable computer readable media may include storage or memory media such as semiconductor, magnetic, and/or optical media. For example, storage or memory media may include conventional hard disks, Compact Disk-Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Suitable processor-readable media may also include transmission media such as electrical, electromagnetic, or digital signals, conveyed, e.g. through the communication system 710, via a communication medium, such as a network and/or a wireless link. Combinations of the above are also included within the scope of computer readable media.

Methods of the invention can be implemented in computer readable instructions, such as program modules or applications, which are executed by a data processor. Generally, program modules or applications include routines, programs, objects, data components, data structures, algorithms, and the like, which perform particular tasks or implement particular abstract data types. These represent examples of program code means for executing steps of the methods disclosed herein. The particular sequence of such executable instructions or associated data structures represent examples of corresponding acts for implementing the functions described in such steps.

Databases as used herein may be either conventional databases or data storage formats of any type, e.g. data files. Although separate databases are recited herein, one or more of such databases may be combined.

Figure 8:
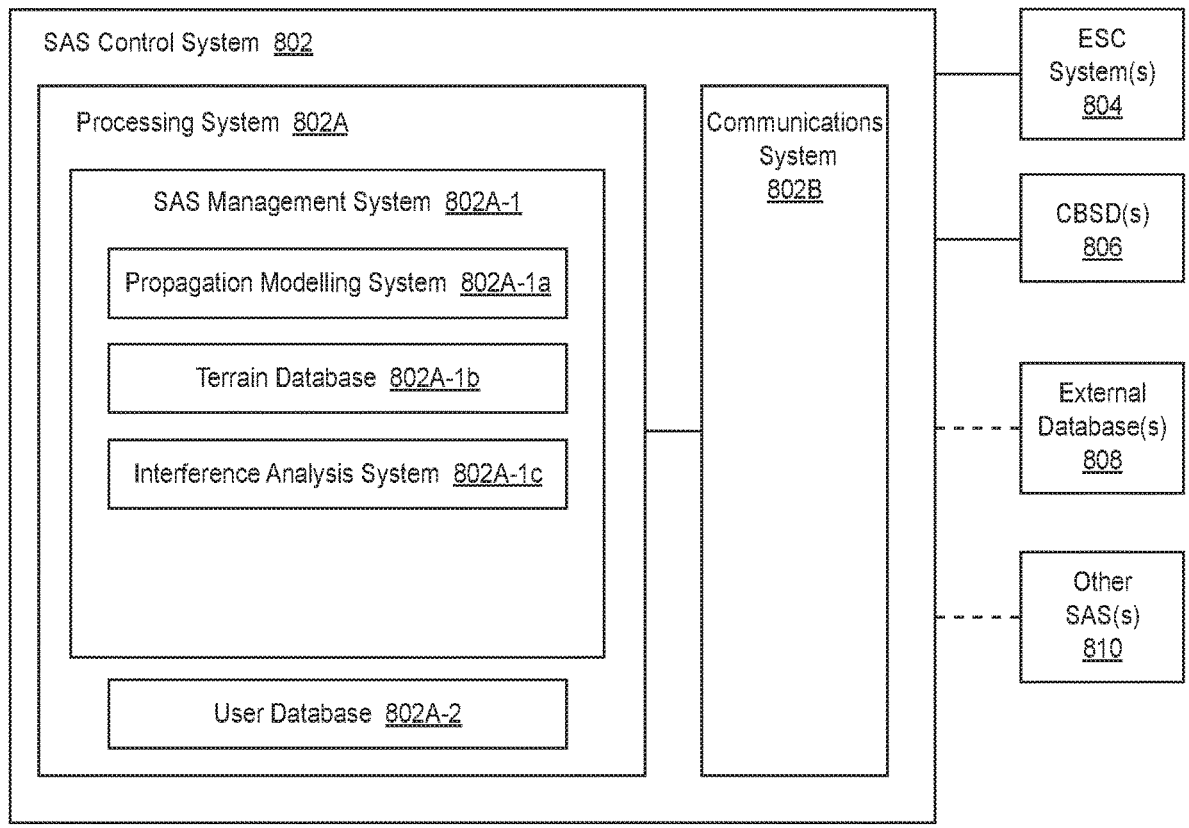
FIG. 8 illustrates an exemplary spectrum access system.

The methods described herein can also be implemented in a SAS. FIG. 8 illustrates an exemplary SAS 800. The illustrated SAS 800 includes a SAS control system 802 coupled to at least one environmental sensing capability (ESC) system 804, at least one CBSD (CBSD(s)) 806, and at least one external database (external database(s)) 808. Each CBSD is operated by a GAA user and/or a PAL.

The external databases include without limitation: (a) databases, e.g. government databases (such as provided by the U.S. Federal Communications Commission), which store information about CBSD(s), priority access licensees (PALs), and/or incumbent users; and (b) databases, e.g. government databases (such as the U.S. Geological Survey), storing information about terrain and other obstructions (e.g. buildings) and geographic morphology. In one embodiment, external databases that store terrain information store elevation data and/or geographic morphology data, e.g. every 30 m. In another embodiment, such data is geodesic map data.

In one embodiment, the SAS 800 is coupled to at least one other SAS (SAS(s)) 810, e.g. operating in the same or overlapping frequency spectrum. For example, such other SAS(s) 810 and their PALs, GAA users, and associated incumbent users may generate electromagnetic energy that overlaps the geographic region of the SAS 800, and thus must be accounted for by the SAS 800 when the SAS 800 performs interference analysis, and authorizes operation of CBSDs 806 of the PALs and the GAA users. Alternatively, the SAS 800 and its PALs, GAA users, and associated incumbent users may generate electromagnetic energy that overlaps the geographic region of the other SAS(s) 810, and thus must be accounted for by the other SAS(s) 810 when the SAS performs interference analysis, and authorizes operation of CBSDs of PALs and GAA users (associated with the other SAS(s) 810). By coupling SASs that are geographically proximate to one another, each SAS can account for electromagnetic energy emitted from CBSD(s) of other SAS(s) proximate geographies.

The Environmental Sensing Capability (ESC) system 804 detects, and communicates to the SAS 800, the presence of signal(s), e.g. from incumbent user(s). The SAS control system 802 uses this information, at least in part, to regulate the operation (e.g. power levels and frequencies of operation) of the CBSD(s) 806 to allow the incumbent user(s) to operate free of interference.

The SAS control system 802 controls the operation (e.g. power levels and frequencies of operation) of the GAA user(s) so that the PAL(s) operate free of interference. Further, the SAS control system 802 controls the operation e.g. power levels and frequencies of operation) of GAA user(s), e.g. so each GAA user operates free of interference.

In one embodiment, the SAS control system 802 includes a processing system 802A coupled to a communications system 802B. The processing system 802A controls the operation of CBSD(s) 806 that form part of the SAS 800. In another embodiment, the processing system 802A is implemented with the state machine 702.

The communications system 802B facilitates communications between the SAS control system 802 and other systems or devices, e.g. CBSD(s) 806, the ESC system(s) 804, and/or other SAS(s) 810. In one embodiment, the communications system 802B is implemented with the communications system 710.

In the illustrated embodiment, the processing system 802A includes a SAS management system 802A-1 and a user database 802A-2. The user database 802A-2 includes information about geographic location, operating frequency spectrum, power output level of operation, modulation types, antenna radiation patterns, and/or maximum tolerable interference level of each CBSD of respectively the PALs and GAA users whose CBSDs are included in the SAS 800. In one embodiment, the SAS management system 802A-1 includes a propagation modelling system 802A-1a, a terrain database 802A-1b, and an interference analysis system 102A-1c. Database as used herein means any data storage technique, including a conventional database, data files, and/or storage registers.

The interference analysis system 102A-1c performs interference analysis as described elsewhere herein. In one embodiment, the methods described above, and/or the database described above to be used with such methods, are implemented in the interference analysis system 802A-1c.

Example Embodiments

Example 1 includes a method, comprising: determining a free space path loss distance at a frequency of a transmitter; determining a morphology class for a geographic location of the transmitter; determining a scaling factor P corresponding to the determined morphology class; determining a circular analysis region based upon the scaling factor P; and generating a contour.

Example 2 includes the method of Example 1, wherein the determining the free space path loss distance at the transmission frequency comprises determining:

$$R_{FSPL} = 10^{\left(\frac{PL-20\log_{10}f-k}{20}\right)},$$

where PL=txPower+Gain−rxPower, and the $R_{FSPL}$ is the free space path loss distance, the f is transmission frequency, the PL is path loss in decibels, the txPower is transmitter power in decibels (referenced to a power level) per a unit frequency, the Gain is antenna gain in decibels, and the rxPower is the propagated power level equal to the first threshold level in decibels (reference to the power level) per the unit frequency.

Example 3 includes the method of any of Examples 1-2, wherein determining the morphology class for the geographic location of the transmitter comprises determining a morphology class comprising one of rural, suburban, and urban; and wherein determining the scaling factor P comprises determining a scaling factor P comprising one of $P_{urban}$, $P_{suburban}$, and $P_{rural}$.

Example 4 includes the method of Example 3, wherein determining the scaling factor P comprising the one of $P_{urban}$, $P_{suburban}$, and $P_{rural}$ comprises determining a scaling factor P comprising one of $P_{urban}$, $P_{suburban}$, and $P_{rural}$ where $0<P_{urban}<P_{suburban}<P_{rural}\leq$ Example 1.

Example 5 includes the method of any of Examples 3-4, wherein determining the scaling factor P comprises determining whether the transmitter is inside of a building; and if the transmitter is inside of the building, wherein determining the scaling factor further comprises multiplying the scaling factor P, comprising the one of $P_{urban}$, $P_{suburban}$, and $P_{rural}$, by $P_{indoor}$, where $P_{indoor}$ is less than one.

Example 6 includes a system, comprising: a state machine, wherein the state machine is configured: determine a free space path loss distance at a frequency of a transmitter; determine a morphology class for a geographic location of the transmitter; determine a scaling factor P corresponding to the determined morphology class; determine a circular analysis region based upon the scaling factor P; and determine a contour; and wherein the state machine is configured to be coupled to at least one of (a) at least one input/output device, and (b) a communication system.

Example 7 includes the system of Example 6, wherein the state machine comprises: at least one processor; and at least one memory coupled to at least one processor.

Example 8 includes the system of any of Examples 6-7, wherein the determine the free space path loss distance at the transmission frequency comprises determine:

$$R_{FSPL} = 10^{\left(\frac{PL-20\log_{10}f-k}{20}\right)},$$

where PL=txPower+Gain−rxPower, and the $R_{FSPL}$ is the free space path loss distance, the f is transmission frequency, the PL is path loss in decibels, the txPower is transmitter power in decibels (referenced to a power level) per a unit frequency, the Gain is antenna gain in decibels, and the rxPower is the propagated power level equal to the first threshold level in decibels (reference to the power level) per the unit frequency.

Example 9 includes the system of any of Examples 6-8, wherein determine the morphology class for the geographic location of the transmitter comprises determine a morphology class comprising one of rural, suburban, and urban; and wherein determine the scaling factor P comprises determine a scaling factor P comprising one of $P_{urban}$, $P_{suburban}$, and $P_{rural}$.

Example 10 includes the system of Example 9, determine the scaling factor P comprising the one of $P_{urban}$, $P_{suburban}$, and $P_{rural}$ comprises determine a scaling factor P comprising one of $P_{urban}$, $P_{suburban}$, and $P_{rural}$ where $0<P_{urban}<P_{suburban}<P_{rural}$.

Example 11 includes the system of any Examples 9-10, wherein determine the scaling factor P comprises determine whether the transmitter is inside of a building; and if the transmitter is inside of the building, wherein determine the scaling factor further comprises multiplying the scaling factor P, comprising the one of $P_{urban}$, $P_{suburban}$, and $P_{rural}$, by $P_{indoor}$, where $P_{indoor}$ is less than one.

Example 12 includes a method comprising, determining a maximum range; setting n equal to one, where n is used to determine an incremental angle equal to n*(360 degrees/m), and m is a user or system defined parameter; determining a radial distance along a radial line at the incremental angle; setting n=n+1; determining if the incremental angle is greater than or equal to three hundred and sixty degrees; determining an analysis region; and generating a contour.

Example 13 includes the method of Example 12, wherein determining the maximum range comprises determining the maximum range equal to $R_{FSPL}$, where $$R_{FSPL} = 10^{\left(\frac{PL-20\log_{10}f-k}{20}\right)},$$

a. PL=txPower+Gain−rxPower, and the $R_{FSPL}$ is the free space path loss distance, the f is transmission frequency, the PL is path loss in decibels, the txPower is transmitter power in decibels (referenced to a power level) per a unit frequency, the Gain is antenna gain in decibels, and the rxPower is the propagated power level equal to the first threshold level in decibels (reference to the power level) per the unit frequency.

Example 14 includes the method of any of Examples 12-13, further comprising computing a gain database from the maximum range.

Example 15 includes the method of Example 14, wherein computing gain database comprises computing the gain database from 0 dB to substantially the difference between the horizontal antenna radiation pattern gain at boresight, and the minimum gain of the horizontal antenna radiation pattern.

Example 15 includes a system, comprising: a state machine, wherein the state machine is configured: determine a maximum range; set n equal to one, where n is used to determine an incremental angle equal to n*(360 degrees/m), and m is a user or system defined parameter; determine a radial distance along a radial line at the incremental angle; set n=n+1; determine if the incremental angle is greater than or equal to three hundred and sixty degrees; determine an analysis region; and generate a contour; and wherein the state machine is configured to be coupled to at least one of (a) at least one input/output device, and (b) a communication system.

Example 17 the system of Example 16, wherein determine the maximum range comprises determine the maximum range equal to $R_{FSPL}$, where $$R_{FSPL} = 10^{\left(\frac{PL-20\log_{10}f-k}{20}\right)},$$

PL=txPower+Gain−rxPower, and the $R_{FSPL}$ is the free space path loss distance, the f is transmission frequency, the PL is path loss in decibels, the txPower is transmitter power in decibels (referenced to a power level) per a unit frequency, the Gain is antenna gain in decibels, and the rxPower is the propagated power level equal to the first threshold level in decibels (reference to the power level) per the unit frequency.

Example 18 includes the system of any of Examples 16-17, further comprising compute a gain database from the maximum range.

Example 19 includes the system of any of Examples 16-18, wherein compute the gain database comprises compute the gain database from 0 dB to substantially the difference between the horizontal antenna radiation pattern gain at boresight, and the minimum gain of the horizontal antenna radiation pattern.

Example 20 includes a method of generating a contour, comprising, determining a contour radial distance, $R_C$; setting n equal to one, where n is used to determine an incremental angle (ΔA) equal to n*(360 degrees/m), and m is a user or system defined parameter; estimating, for the incremental angle, a radial distance where the propagated power level may equal a first threshold level; determining the propagated power level at the estimated radial distance and at the incremental angle, where:

rxPower=txPower+Gain−PL, where PL is path loss, txPower is transmitter power ratio per unit of frequency, Gain is antenna gain ratio, and rxPower is the propagated power level; determining if the absolute value of a difference between the propagated power level and the first threshold level is less than a tolerance level; if the absolute value is not within the tolerance level, then modifying the radial distance based upon whether the sign of the difference is negative or positive; if the absolute value is within the tolerance level, then setting n=n+1; and determining if the incremental angle is greater than or equal to three hundred and sixty degrees.

Example 21 includes the method of Example 20, wherein determining the contour radial distance comprises determining a contour radial distance at a horizontal antenna pattern's boresight.

Example includes 22 the method of any of Examples 20-21, wherein estimating, for the incremental angle, a radial distance, comprises estimating the radial distance by setting the radial distance equal to the radial distance, for the prior incremental angle, where the propagated power level was substantially equal to the first threshold level.

Example 23 includes a system, comprising: a state machine, wherein the state machine is configured to: determine a contour radial distance, $R_C$; setting n equal to one, where n is used to determine an incremental angle (ΔA) equal to n*(360 degrees/m), and m is a user or system defined parameter; estimate, for the incremental angle, a radial distance where the propagated power level may equal the first threshold level; determine the propagated power level at the estimated radial distance and at the incremental angle, where:

rxPower=txPower+Gain−PL, where PL is path loss, txPower is transmitter power ratio per unit of frequency, Gain is antenna gain ratio, and rxPower is the propagated power level; determine if the absolute value of a difference between the propagated power level and the first threshold level is less than a tolerance level; if the absolute value is not within the tolerance level, then modify the radial distance based upon whether the sign of the difference is negative or positive; if the absolute value is within the tolerance level, then set n=n+1; and determine if the incremental angle is greater than or equal to three hundred and sixty degrees; and wherein the state machine is configured to be coupled to at least one of (a) at least one input/output device, and (b) a communication system.

Example 24 includes the system of Example 23, wherein determine the contour radial distance comprises determine a contour radial distance at a horizontal antenna pattern's boresight.

Example 25 includes the system of any of Examples 23-24, wherein estimate, for the incremental angle, the radial distance, comprises estimate the radial distance by setting the radial distance equal to the radial distance, for the prior incremental angle, where the propagated power level was substantially equal to the first threshold level.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:

1. A method, comprising:
   determining a free space path loss distance at a frequency of a transmitter;
   determining a morphology class, comprising one of rural, suburban, and urban, for a geographic location of the transmitter;
   determining a scaling factor P, comprising one of $P_{urban}$, $P_{suburban}$, and $P_{rural}$, wherein $P_{urban}$ is a scaling factor for an urban morphology, $P_{suburban}$ is a scaling factor for a suburban morphology and rural, is $P_{rural}$, a scaling factor for a rural morphology, and, wherein $$0 < P_{urban} < P_{suburban} < P_{rural} < 1$$

determining a circular analysis region based upon the scaling factor P and having a radius; and
   generating a contour for a power level emitted by the transmitter, where the contour is configured to be used to manage interference generated by the transmitter and has a maximum radial distance that is less than the radius.

2. The method of claim 1, wherein determining the free space path loss distance at the frequency of the transmitter comprises determining:

$$R_{FSPL} = 10^{\left(\frac{PL - 20\log_{10} f - k}{20}\right)},$$

where PL=txPower+Gain−rxPower, and
   the $R_{FSPL}$, is the free space path loss distance, the f is the frequency of the transmitter, the PL is path loss in decibels, the txPower is transmitter power in decibels, referenced to a reference power level, per a unit frequency, the Gain is antenna gain in decibels, and the rxPower is a propagated power level equal to a first threshold level in decibels, referenced to the reference power level, per the unit frequency.

3. The method of claim 1, wherein determining the scaling factor P comprises determining whether the transmitter is inside of a building; and when the transmitter is inside of the building, then determining the scaling factor P further comprises multiplying the scaling factor P by $P_{indoor}$, where the $P_{indoor}$ is less than one.

4. A system, comprising:

state machine circuitry, wherein the state machine circuitry is configured:

determine a free space path loss distance at a frequency of a transmitter;

determine a morphology class, comprising one of rural, suburban, and urban, for a geographic location of the transmitter;

determine a scaling factor P, comprising one of $P_{urban}$, $P_{suburban}$, and $P_{rural}$, wherein $P_{urban}$ is a scaling factor for an urban morphology, $P_{suburban}$ is a scaling factor for a suburban morphology and $P_{rural}$, is a scaling factor for a rural morphology, and wherein $$0 < P_{urban} < P_{suburban} < P_{rural} < 1$$

determine a circular analysis region based upon the scaling factor P and having a radius; and determine a contour, for a power level emitted by the transmitter, having a maximum radial distance that is less than the radius, where the state machine circuitry is further configured to use the contour to manage interference generated by the transmitter.

5. The system of claim 4, wherein the state machine circuitry comprises:

at least one processor circuit; and at least one memory circuit coupled to the at least one processor circuit.

6. The system of claim 4, wherein determine the free space path loss distance at the frequency of the transmitter comprises determine:

$$R_{FSPL} = 10^{\left(\frac{PL-20\log_{10}f-k}{20}\right)},$$

where PL=txPower+Gain−rxPower, and the $R_{FSPL}$, is the free space path loss distance, the f is the frequency of the transmitter, the PL is path loss in decibels, the txPower is transmitter power in decibels, referenced to a reference power level, per a unit frequency, the Gain is antenna gain in decibels, and the rxPower is a propagated power level equal to a first threshold level in decibels, reference to the reference power level, per the unit frequency.

7. The system of claim 4, wherein determine the scaling factor P comprises determine whether the transmitter is inside of a building; and when the transmitter is inside of the building, then determine the scaling factor P further comprises multiplying the scaling factor P by $P_{indoor}$, where the $P_{indoor}$ is less than one.

8. A computer program product comprising a non-transitory processor readable medium on which program instructions are embodied, wherein the program instructions are configured, when executed by at least one programmable processor, to cause the at least one programmable processor to:

determine a free space path loss distance at a frequency of a transmitter;

determine a morphology class, comprising one of rural, suburban, and urban, for a geographic location of the transmitter;

determine a scaling factor P, comprising one of $P_{urban}$, $P_{suburban}$, and $P_{rural}$, wherein $P_{urban}$ is a scaling factor for an urban morphology, $P_{suburban}$ is a scaling factor for a suburban morphology and $P_{rural}$, is a scaling factor for a rural morphology, and, wherein $0 < P_{urban} < P_{suburban} < P_{rural} < 1$ determine a circular analysis region based upon the scaling factor P and having a radius; and generate a contour for a power level emitted by the transmitter, where the contour is configured to be used to manage interference generated by the transmitter and has a maximum radial distance that is less than the radius.

9. The computer program product of claim 8, wherein determine the free space path loss distance at the frequency of the transmitter comprises determine:

$$R_{FSPL} = 10^{\left(\frac{PL-20\log_{10}f-k}{20}\right)},$$

where PL=txPower+Gain−rxPower, and the $R_{FSPL}$, is the free space path loss distance, the f is the frequency of the transmitter, the PL is path loss in decibels, the txPower is transmitter power in decibels (referenced to a reference power level) per a unit frequency, the Gain is antenna gain in decibels, and the rxPower is a propagated power level equal to a first threshold level in decibels (reference to the reference power level) per the unit frequency.

10. The computer program product of claim 8, wherein determine the scaling factor P comprises determine whether the transmitter is inside of a building; and when the transmitter is inside of the building, then determine the scaling factor P further comprises multiplying the scaling factor P by $P_{indoor}$, where the $P_{indoor}$ is less than one.

* * * * *